June 2, 1953  D. H. SMITH  2,640,703
RECORD CHANGER
Filed Oct. 13, 1948  6 Sheets-Sheet 1

INVENTOR.
DUDLEY H. SMITH
J. A. Grier
ATTORNEY.

June 2, 1953  D. H. SMITH  2,640,703
RECORD CHANGER
Filed Oct. 13, 1948  6 Sheets-Sheet 2

INVENTOR.
DUDLEY H. SMITH
BY J. A. Grier
ATTORNEY

INVENTOR.
DUDLEY H. SMITH
BY J. G. Grier
ATTORNEY

June 2, 1953 D. H. SMITH 2,640,703
RECORD CHANGER
Filed Oct. 13, 1948 6 Sheets-Sheet 4

INVENTOR
BY DUDLEY H. SMITH
J. A. Grier
ATTORNEY

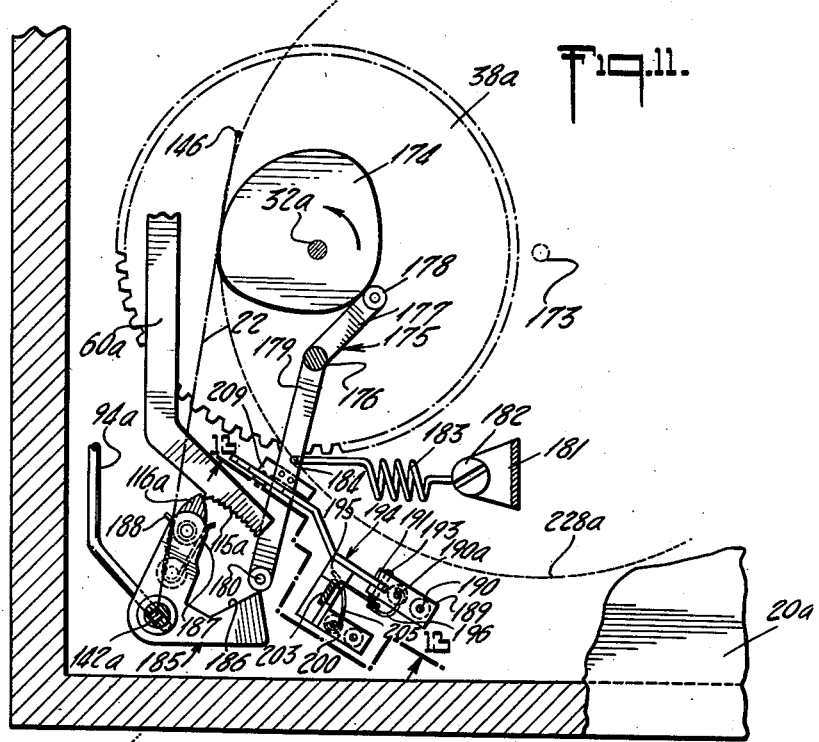
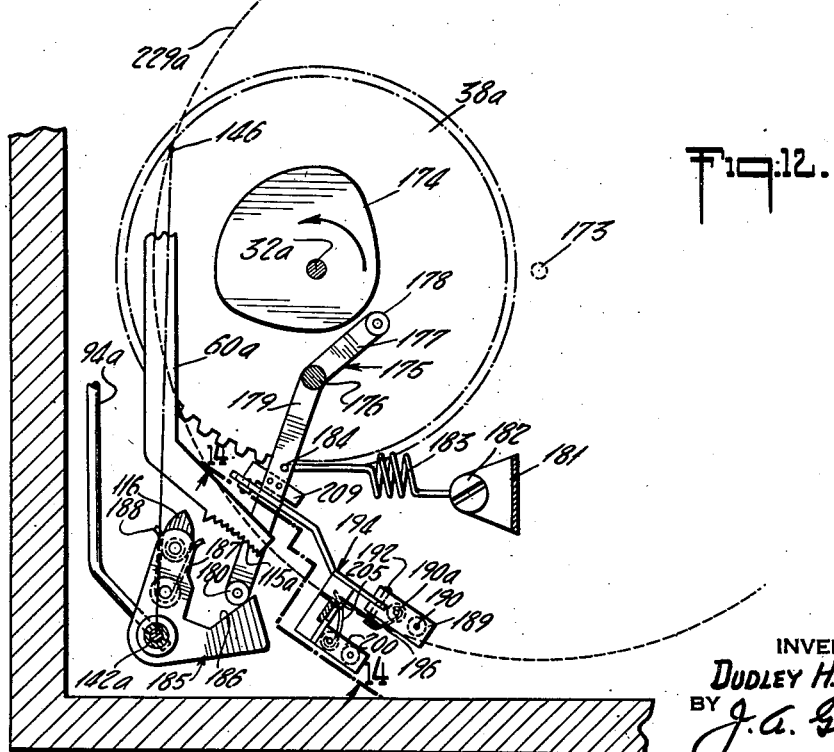

June 2, 1953  D. H. SMITH  2,640,703
RECORD CHANGER
Filed Oct. 13, 1948  6 Sheets-Sheet 6
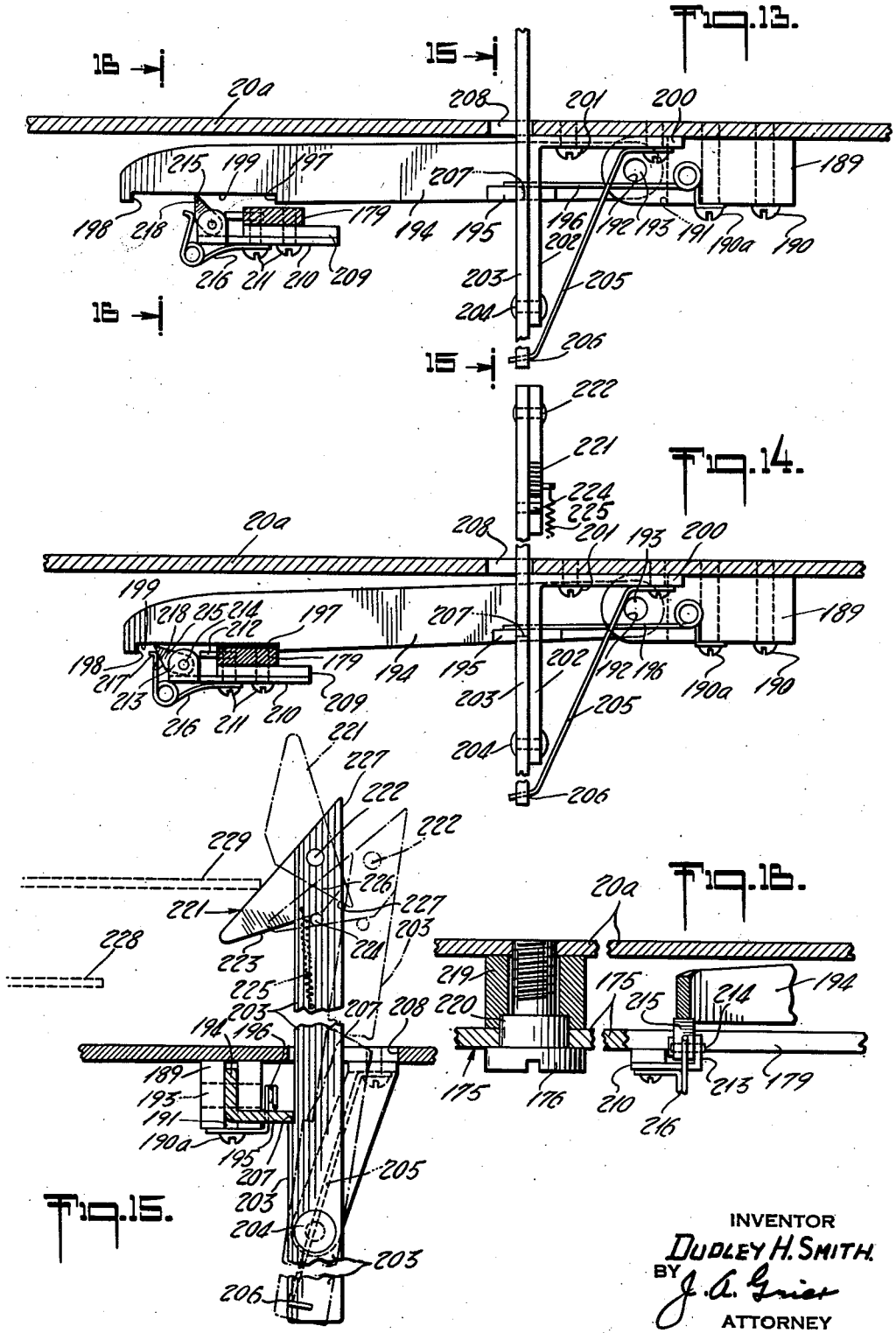
INVENTOR
DUDLEY H. SMITH
BY
ATTORNEY Patented June 2, 1953

2,640,703

UNITED STATES PATENT OFFICE 2,640,703

RECORD CHANGER

Dudley H. Smith, Brooklyn, N. Y.

Application October 13, 1948, Serial No. 54,320

5 Claims. (Cl. 274—10)

This invention relates to improvements in record changers and has for a principal object the provision of improved trigger mechanism for instituting a record changing cycle.

Another object of the invention is the provision in a record changer, of the type where the records are dropped onto the turntable one at the time from a group of records supported above the turntable, of means, engaged by each record as it is falling, for slowing the rate of the fall, thereby preventing the records from breaking as a result of the fall.

A further object of the invention is the provision in a record changer, of a trip, out of the range of records of one diameter as they are dropped onto the turntable but within the range of records of larger diameter for electrically controlling the position of the needle as the tone arm is let down so that said needle will engage the beginning of the sound track on the larger record.

Another object of the invention is the provision, in a record changer of the type where records are dropped onto the turntable from a group of records supported above the turntable, of mechanism for normally positioning the tone arm to play ten inch records, and the provision of trip means engaged by twelve inch records falling onto the turntable for causing the tone arm to be positioned properly to play each twelve inch record after it arrives on the turntable, thereby enabling me to provide a device for playing ten and twelve inch records intermixed, employing a minimum of mechanical parts.

Other objects and advantages of the invention will be apparent to those skilled in the art upon a study of the following specification and the accompanying drawings.

Referring to the drawings:

Figure 11 is a view of a modification of the mechanism for moving and letting down the tone arm, showing the normal positions of the elements when the playing of a ten inch record is initiated;

Figure 12 is a view similar to Figure 11, and showing the positions of the elements when the playing of a twelve inch record is initiated;

Figure 13 is an elevation, partly in section, taken along the lines 13—13 of Figure 11;

Figure 14 is an elevation, partly in section, taken along the lines 14—14 of Figure 12;

Figure 15 is an elevation, partly in section, taken along the lines 15—15 of Figure 13; and Figure 16 is a sectional elevation as seen along the lines 16—16 of Figure 13.

Figure 1:
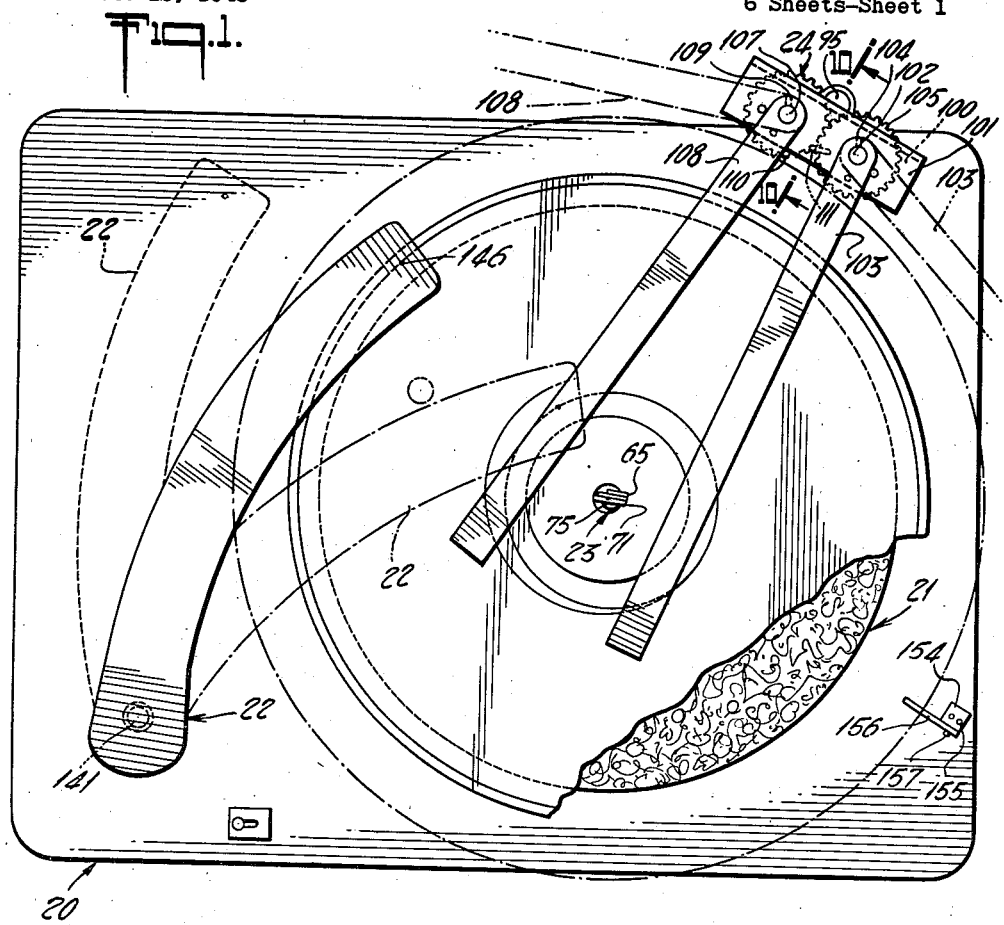
Figure 1 is a plan view of my improved record changer.
Figure 2:
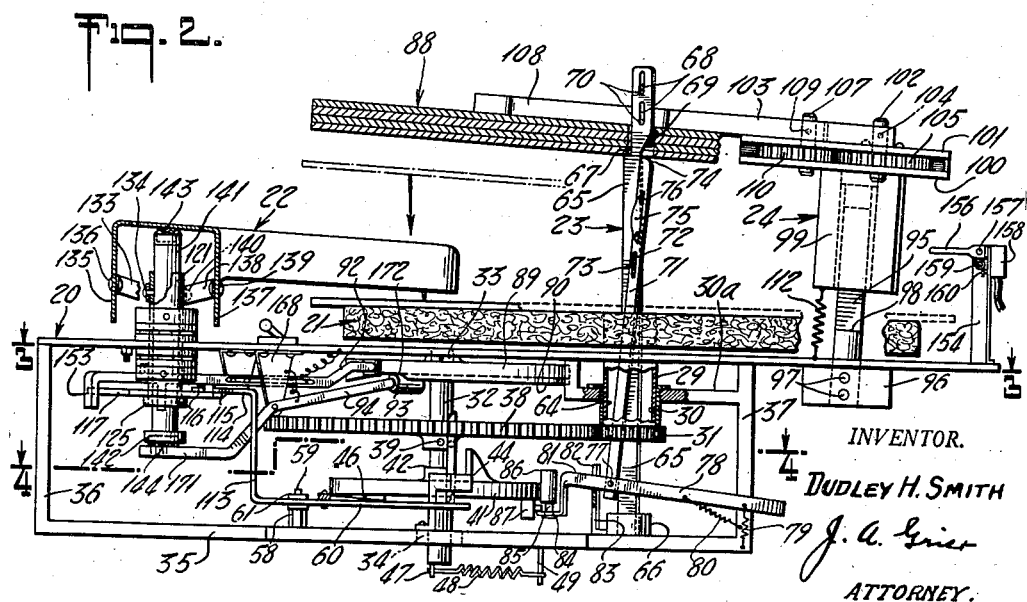
Figure 2 is a side elevation, partially in section, of the record changer shown in Figure 1.

Referring first to Figures 1 and 2, the improved record changer includes a base plate 20, a turntable 21, a reproducer arm 22, a center post 23 which supports the records above the turntable, and a record hold-down device 24, and mechanism supported below the base plate 20 which will hereinafter be described in detail. The turntable 21, as may be seen in Figure 3, has depending rim 25 which is in frictional engagement with a rubber rimmed wheel 26, which is constantly rotated by the shaft 27 of an electric motor 28. The turntable has fixed thereto a central sleeve 29 which is journaled in a bearing 30 mounted in the cross member 30a, and it may also be journaled in a bushing (not shown) supported in the plate 20 in spaced relation to the bearing 30. On the lower end of the sleeve 29 is secured a pinion 31. This pinion is bored out and is fixedly mounted on the exterior of the sleeve 29, thereby leaving the interior free to support elements which will presently be described. Spaced apart from the sleeve 29 and parallel thereto, is a vertical shaft 32 which has a bearing 33 in the base plate 20 and a bearing 34 in a subframe 35, as may also be seen in Figures 7 and 7A. The sub-frame 35 has vertical webs 36 and 37 which are secured to the plate 20.

Secured to the shaft by means of a taper pin 39 and in alignment with the pinion 31 is a gear 38. The gear 38 as may be seen in Figure 3, has a portion 40 where the teeth have been removed, so that when this portion is encountered by the pinion 31 and the gear wheel is held at rest, the turntable 21 is free to rotate, as for example when the record is being played.

Also secured on the shaft 32 is a cam 41 which has a hub 42 carrying a set screw 43 engaging the shaft 32. The cam 41 carries on its upper surface a camming member 44 (see Figures 2, 4, 6, 7 and 7A). The cam also has a lateral lobe 45 and a lobe 46 on the under-surface thereof. The purposes of these lobes will be presently described.

The shaft 32 carries on its lower end a sleeve 51 which is secured thereon by a cross pin 52 and this sleeve carries a pin 47 which is parallel to and eccentric with respect to the axis of shaft 32, and secured to this pin is one end of a spring 48, the other end being secured to a stud 49 carried on the sub-frame 35. The spring urges the pin 47 to a position where the cut-away portion 40 of the gear 38 is in alignment with the pinion 31, so that there is no engagement of the gear with the latter. This position of the pin is shown in Figure 7A. The gear 38 has a plurality of radial spokes 50.

Figure 3:
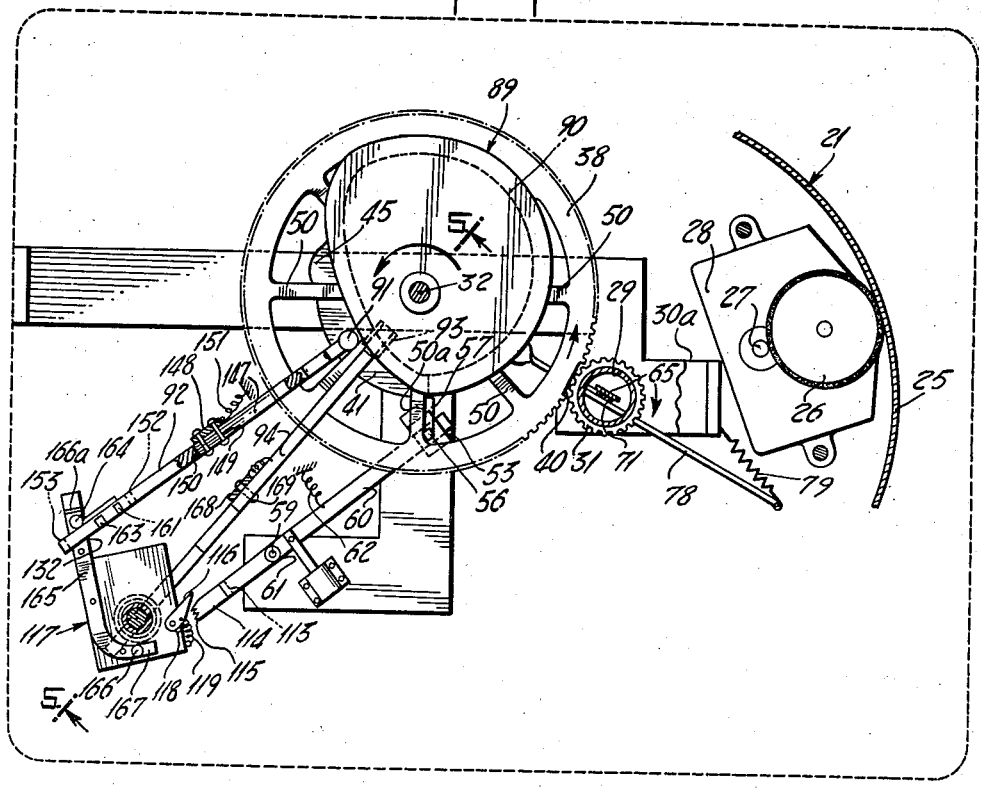
Figure 3 is a view as seen along the lines 3—3 of Figure 2.
Figure 4:
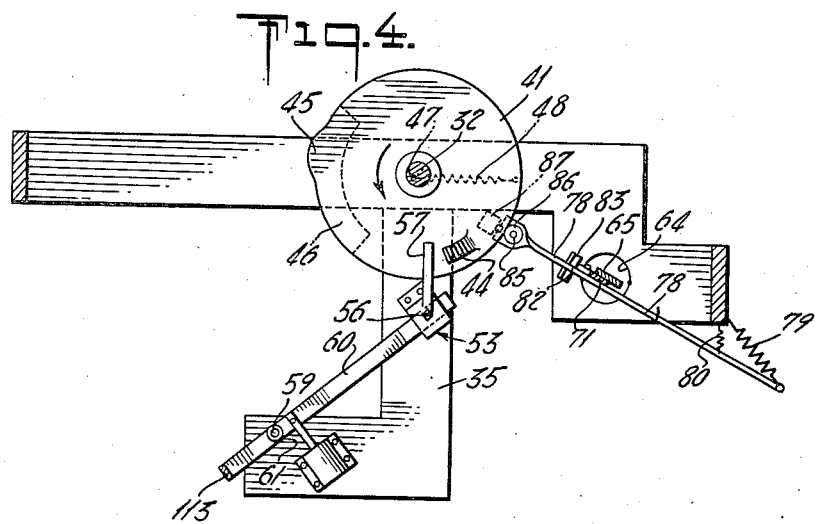
Figure 4 is a view taken along the lines 4—4 of Figure 2.
Figure 6:
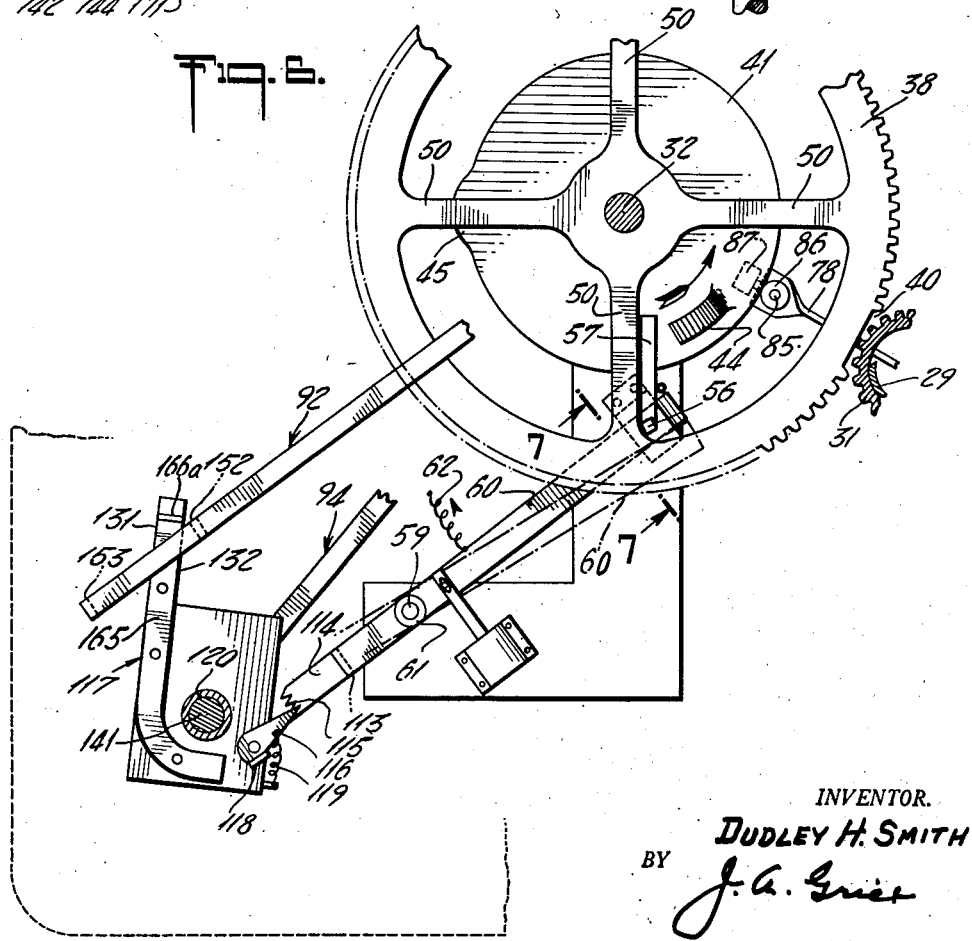
Figure 6 is an enlarged view partly broken away and showing details of some of the mechanism.
Figure 7:
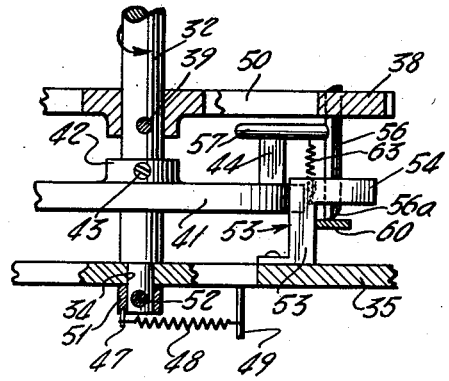
Figure 7 is an elevation, partly in section and taken along the lines 7—7 of Figure 6.
Figure 7A:
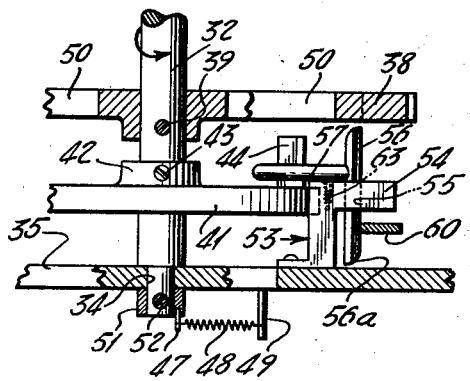
Figure 7A is an elevation similar to Figure 7, but showing the parts in other positions as occurs during a certain portion of the operating cycle.

Referring now to Figures 7 and 7A, a Z-shaped bracket 53 has formed in the horizontal portion 54 a vertical square hole 55. Reciprocally carried in the hole 55 is a square shaft 56, the upper end of which is adapted to engage one of the spokes in the gear 38 and function as a stop. The shaft 56 has a horizontal projection 57 which is preferably round in cross-section and this projection extends generally toward the shaft 32, as shown in Figures 3 and 6, and consequently it spans a portion of the cam 41. As the shaft 32 rotates, the camming member 44 carried on the cam 41 engages the projection 57 and consequently urges the shaft 56 upwardly so that its upper end extends between two spokes 50 of the gear 38, with the result that the gear 38 stops with its spoke 50a in contact with the shaft 56 and with the gear 38 at rest in this position, the cutaway portion 40 is in alignment with the pinion 31 and therefore there is no engagement of the pinion with the gear at this point, thereby leaving the turntable free to rotate to play a record.

Due to the position of the camming member 44 on the cam 41, the gear 38 always stops with the spoke 50a in contact with the shaft 56, when the latter is raised by the camming member 44.

The sub-frame 35 has a stud 58 secured thereto and formed integral with the stud is a shaft 59. A lever 60 carries a bushing 61 which is journaled on the shaft 59. The normal position of the lever 60 is against the shaft 56, as shown in Figure 7A. Now, as soon as the camming member 44 raises the shaft 56, the lever 60 moves over against the vertical leg of the Z-shaped member 53 under the urge of the spring 62 and retains the shaft in the position shown in Figure 7, and thereby the gear 38 is held at rest and in non-engagement relation with the pinion 31. A spring 63 has one end connected to the projection 57 and has its other end connected to the Z-shaped bracket 53 so that when the camming member 44 raises the projection 57, the spring 63 is tensioned and tends to urge the shaft 57 downwardly, but it is prevented from moving downwardly as long as the lever 60 is beneath it. The lower end of the shaft 56 has a rounded portion 56a against which the lever 60 may cam when the shaft 56 is being raised.

Figure 8:
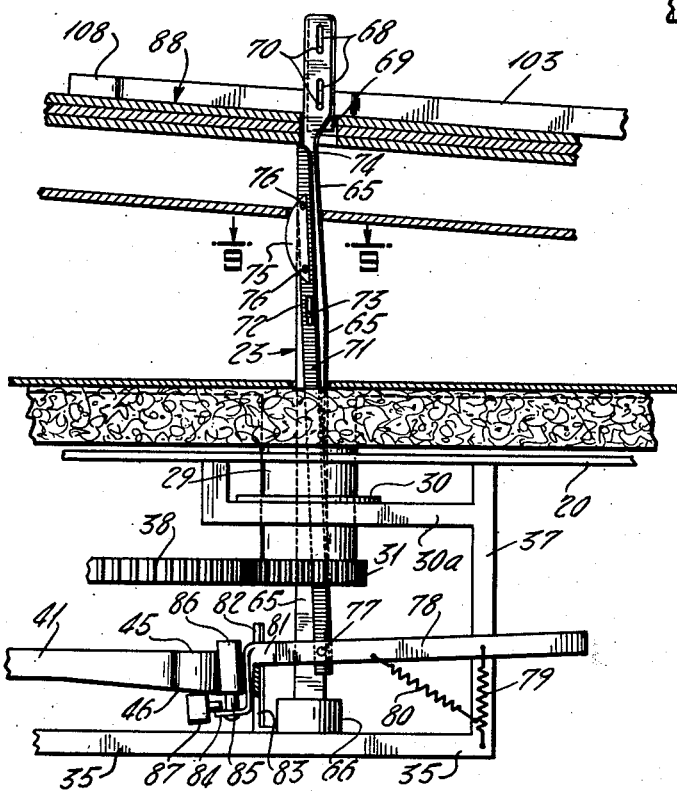
Figure 8 is a fragmentary elevation, partly in section, showing means for supporting a group of records above the turntable and for releasing one record at the beginning of each operating cycle.

Referring now to Figures 2 and 8, the interior passage 64 formed in the tubular shaft 29 serves as clearance for the center post 23 which is comprised of elements 65 and 71. The post member 65 has the lower end secured to the sub-frame 35 by means of a bracket 66. This post member 65, which is generally rectangular in cross-section, has a notch 67 formed therein a predetermined height above the turntable 21 and this notch serves as a ledge upon which the records to be played are supported.

The post 65 above the notch 67 has aligned slots 68 formed therein and a slidable member 69, also generally rectangular in cross-section, has escutcheon pins 70 therein which extend through the slots 68 and permit the slidable member 69 to be moved up and down.

A second post element 71 has an elongated slot 72 formed therein and an escutcheon pin 73 extends through the slot and is riveted into the post member 65 so that the post element 71 is both slidably and pivotally connected to the post member 65. The upper end 74 of the post element 71 is rounded, as shown, and intermediate the ronded end 74 and the elongated slot 72, a rubber-like buffer member 75 is secured onto the element 71, which retards the fall of records from the height of the notch 67 to the turntable or the top record thereon. Pivotally connected to the lower end of the element 71, by means of a pivot pin 77, is a lever 78. To the right of the pivot 77, as seen in Figure 2, the lever 78 is straight and it has a spring 79 connected thereto and to the sub-base 35 which urges the lever in a clockwise direction about the pivot pin 77. Also connected to the straight portion of the lever 78 is a second spring 80 which is also connected to the sub-base or frame 35 in such a manner that the lever, and consequently the lower end of the element 71, is urged to the right, as seen in Figure 2. The portion 81 of the lever, to the left of the pivot pin 77, passes through a slot 82 formed in a bracket 83. The extreme left end of the portion 81 is offset downwardly and carries a horizontal portion 84, carrying a stud 85 upon which a roller 86 is mounted. The portion 84 also carries a horizontal stud upon which a roller 87 is mounted. The roller 86 bears against the periphery of the cam 41 and is adapted to be actuated by the lobe 45 and the roller 87 bears against the under-surface of the cam 41 and is adapted to be actuated by the cam surface 46, with the result that the lower end of the element 71 is moved laterally by the lobe 45 and is moved endwise by the cam surface 46. The lobe and the cam surface are so proportioned that the element 71 is moved upwardly (endwise) a little less than the thickness of the record, and then the element 71 is swung about the pivot 73 in a counter-clockwise direction, sufficiently to move the lower record of the stack 88 to the left to a point where the hole therein clears the ledge 67, thus allowing the record to drop downwardly along the post 23. However, when the element 71 is moved counter-clockwise, as aforesaid, the buffer 75 has also moved to the left and a portion of it is in the path of the falling record, and thus the fall of the record is retarded. This feature prevents breakage of the records from falling, which is often encountered in record changers of the type similar to the one herein described.

The shaft 32 also has secured thereon, just below the top plate 20, a cam 89, the general outline of which is shown in Figure 3. The cam 89 also has a follow surface 90 on the under side thereof. A roller 91, carried on a member 92, which will presently be described, bears on the periphery of the cam 89 and is moved thereby. A roller 93 is pivotally carried on the end of a lever member 94, which will also presently be described, and this roller bears against the follow cam surface 90 on the under side of the cam 89.

Figure 10:
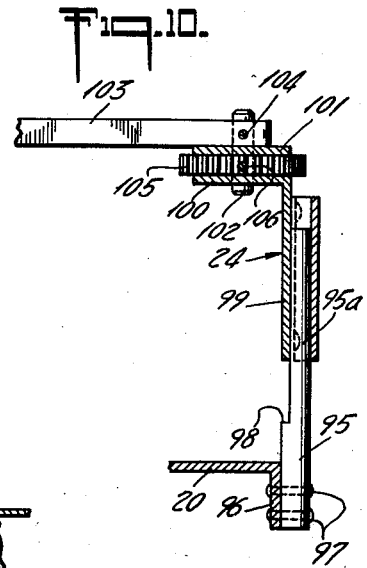
Figure 10 is an elevation, partly in section, of the supporting post for the record hold-down arms.
Figure 9:
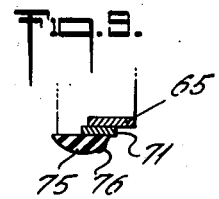
Figure 9 is a sectional view taken along the lines 9—9 of Figure 8.

The record hold-down device 24 includes a shaft or post 95 which is riveted to a lug 96 on the plate 20 by means of rivets 97 (Figures 1, 2 and 10). The shaft 95 has a portion of its length cut away to form a stop or ledge 98. A bushing 99 is slidably carried on the cut away portion 95a of the shaft and the notch 98 limits its downward movement. The bushing 99 has formed integral therewith a portion 100 which is angular with respect to the axis of the bushing 99 and a second flat portion 101 is parallel to and in spaced relation to the portion 100.

A shaft 102 is journaled in aligned holes in the portions 101 and 100 and carried on this shaft is an arm 103, which bears on the upper surface of the portion 101 and which is secured to the shaft by means of a taper pin 104. Between the portions 100 and 101 the shaft carries a gear 105 which is keyed to the shaft 102 by means of a taper pin 106.

The members 100 and 101 have another set of aligned holes therethrough which are spaced apart from and parallel to the holes which receive the shaft 102 and these holes have journaled therein a shaft 107. Secured to the upper end of the shaft and bearing on the upper member 101 is an arm 108. This arm is secured to the shaft by means of a pin 109. Also carried on the shaft between the members 100 and 101 is a gear 110 which is secured to the shaft 107 in the same manner as the gear 105 is secured to the shaft 102 (shown in Figure 10). The spacings between the shafts 102 and 107 is such that the pitch circles of the gears are tangent and consequently the gears cooperate with each other.

When it is desired to put some records on the center post 23, the arms 103 and 108 are swung oppositely, to the positions shown in dot-dash lines in Figure 1; then the records may be placed on the center post 23 and allowed to come to rest with the bottom record of the group resting on the ledge 67, as shown in Figure 2.

Following this, the arms are grasped in a manner to move the bushing 99 endwise on the shaft 95 so as to bring these arms above the level of the stack of records; then, the arms are swung toward each other so that they come to rest in the position shown in Figure 1, which position is gauged by a pin 111 which extends radially from the periphery of the gear 105. When the arms are brought toward each other, this pin engages the hollow between two adjacent teeth in the gear 110. When the arms are released, the hold-down device 24 is urged downwardly both by the force of gravity and under the urge of a spring 112, one end of which is secured to the bushing 99 and the other end of which is secured to the plate 20.

It will be noted in Figure 2 that the shaft 95 is inclined at a slight angle to the vertical and consequently the arms and the records guided thereby are inclined substantially the same angle with respect to the horizontal. In the embodiment shown, the arms and the records are inclined approximately 10° with respect to the horizontal.

Referring to Figures 2, 3 and 6, the arm 60 has a portion 113 which extends vertically and joining the portion 113 is a horizontal portion 114, the outer end of which carries a plurality of notches 115 which are adapted to be engaged by a pawl 116 carried on a block member 117. The pawl is provided with a stop 118 and a spring 119 connected to the pawl and to the block member 117, urges the pawl 116 against the stop 118. The block member 117 has an L-shaped notch formed therein which leaves clear an arm, the side surfaces 131 and 132 of which are active surfaces approximately 90° apart. The block member 117 has a hub 120 which is secured to the lower end of a sleeve shaft 121 by means of a set screw 122.

Mounted on the sleeve shaft 121 beneath the plate 20 is a thrust bearing having an upper half 123 bearing against the under-surface of the plate and having a lower half 124 with balls engaging races formed in the two halves. Abutting the lower surface of the half 124 is a collar 125 which is secured to the sleeve shaft 121 by means of a set screw 126. Abutting the upper surface of the plate 20 is the lower half 127 of a second thrust bearing. The thrust bearing has an upper half 128 and between these halves are the usual races and balls. Abutting the half 128 of the bearing is a collar 129 which is secured to the sleeve shaft by means of a set screw 130.

Figure 5:
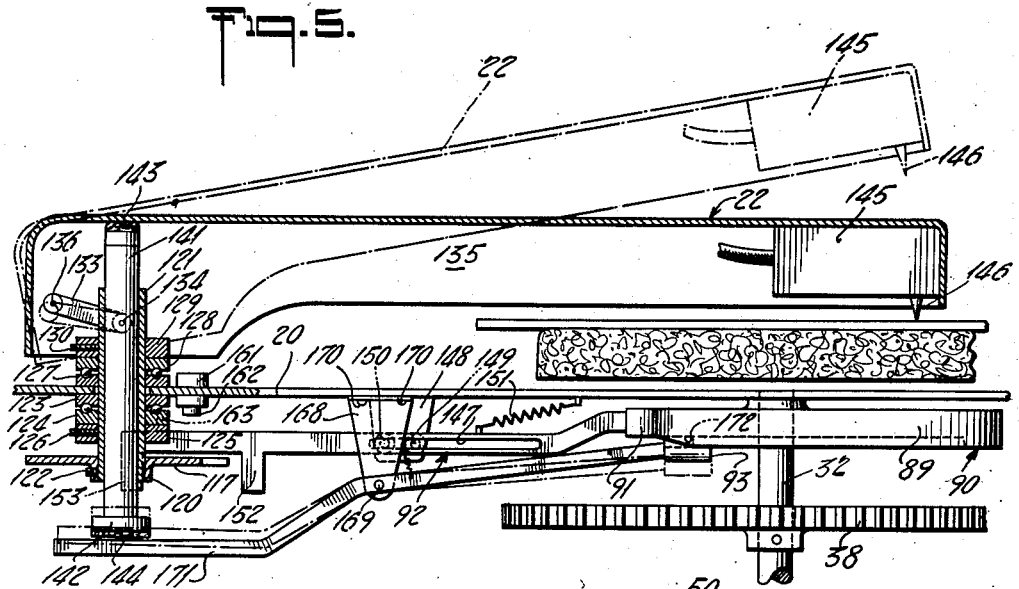
Figure 5 is an elevation, partly in section and taken along the lines 5—5 of Figure 3.

The reproducer arm 22, referring now particularly to Figures 2 and 5, is generally in the form of a channel, the sides of which deepen in the vicinity of the sleeve shaft 121, above described. A link member 133 has one end pivotally connected to the sleeve shaft 121 in any suitable manner, for example, by means of an escutcheon pin 134, and the other end thereof is connected to the channel side 135 of the reproducer arm 22, by an escutcheon pin 136. The channel side 137 of the reproducer arm has one end of a second link member 138 connected thereto by an escutcheon pin 139 and the other end of the link member 138 is connected to the sleeve shaft 121 by means of another escutcheon pin 140.

Reciprocally carried in the sleeve shaft 121 is a shaft 141 which has an enlarged head 142 formed on the lower end thereof. The upper end of the shaft 141 is counterbored and has mounted therein a beveled fiber or other friction disc 143, which bears against the channel 22 intermediate the sides 135 and 137. The enlarged head 142 on the lower end of the shaft 141 is also counterbored and carries a friction disc 144. The purpose of the friction discs is to impose sufficient friction on the tone arm, while it is being moved to the playing position to overcome momentum and ensure accurate registration of the needle with the beginning of the sound track on the next record to be played, and this is effective whether the record is a 10″ record or a 12″ record. When the shaft 141 is urged upwardly, the reproducer arm is moved upwardly and at the same time, the friction is imposed on it and it is subjected to this friction as long as the reproducer arm is swung upwardly to the position shown in dot-dash lines in Figure 5. The reproducer arm 22 may carry in its outer end, the right end as seen in Figure 5, a suitable reproducer 145 which is provided with a suitable stylus 146.

The member 92 previously referred to is a reciprocable member, which as stated above, carries a roller 91 which engages the periphery of the cam 89. The member 92 has an elongated slot 147 formed therein and a bracket 148 depending from the plate 20 has spaced rollers 149 and 150 thereon which are positioned in the slot 147 and consequently guide it along a substantially level path as the member 92 is reciprocated by the cam 89. A spring 151 has one end secured to a stud on the plate 20 and the other end secured to a stud on the member 92 and the function of this spring is to constantly urge the member 92 to the right, as seen in Figure 5, thereby maintaining the roller 91 in contact with the peripheral surface of the cam 89. The reciprocable member 92 has a depending projection 152 and a second like depending projection 153. The projection 153 is on the end of the member 92 and the projection 152 is spaced apart therefrom a predetermined distance away from the projection 153. The functions of these projections are as follows: When the cam 89 (Figure 2 or Figure 3) starts its cycle from the period of rest shown in Figure 2, the member 92 is moved outwardly by the cam and in so moving, the projection 152 engages the active surface 132 on the block member 117 and moves it about its axis in a counter-clockwise direction, as seen in Figure 3, and thereby the reproducer arm 22 is swung to a point where it clears the largest record to be used, which in the present embodiment is a 12" record.

As the cam 89 continues to rotate on the dwell (highest periphery) the tone arm remains at rest, clearing all of the records and then as the surface of the cam begins to recede again, the reciprocable member 92 following the cam is moved in the opposite direction, so that the depending portion 143 engages the active surface 131 on the member 117, and the reproducer arm is moved inwardly to begin playing the next record which is in the meantime dropped onto the turntable.

The length of the reciprocable member 92 is so proportioned that the arm stops normally with the needle 146 above the first groove in the record, so that when the arm is let down (as will next be described) the record begins playing. This occurs every time a 10" record is dropped upon the turntable.

Now, if a 12" record is intermixed with the 10" records, it will be necessary that the reproducer arm 22 stop with the needle 146 in alignment with the first groove on the 12" record. This means that the reproducer arm would not swing in as far, so I provide novel means for arresting the reproducer arm at the proper place after each 12" record is dropped onto the turntable.

In Figures 1 and 2, an upright post 154 is secured on the upper surface of the plate 20 in any suitable manner, for example by rivets 155, and a detent 156 is mounted on a pivot pin 157 on the post 154. The right end portion of the detent 156 is generally square in form and a switch 158, which might be a "micro switch" has an actuating lever 159 extending through a slot in the post 154 in contact with the lower square surface on the detent 156. A spring 160 on the post 154 urges the operating arm 159 upwardly against the square surface on the detent 156. It will be noted that the position of the detent 156 is such that a 10" record dropped onto the turntable 21 will not contact the detent. However, each 12" record which is dropped from the group of records 88 onto the turntable, trips the detent and thereby causes the contacts of the switch 158 to close. A solenoid member 161 extends through the plate 20 and has a plunger 162 which is normally held above the path of a projection 163 on the reciprocable member 92. This solenoid 161 has a "stick" or holding winding which is closed by contact points (not shown) each time the switch member 158 is actuated by the fall of a 12" record.

A contact member 164 is mounted on the reciprocable member 92 and includes a restrained brush which is adapted to bear on a contact strip 165 supported on the block member 117 with insulation 166a therebetween so that it will not be grounded on the block member. Bearing on the contact member 165 is a second restrained brush 166 which has a lug 167 thereon. The restrained brushes 164 and 166 are connected in series with the holding winding of the solenoid 161 so that the plunger 162 remains down in the path of the stop 163 carried on the reciprocable member. This occurs each time a 12" record actuates the detent 156 as it is falling upon the turntable. The contact strip 165 on the block member 117 is in contact with both the restrained brushes 164 and 166 and thereby maintains the holding circuit until the tone arm has moved a little past the 10" position. This is to prevent the tone arm from being jerked from the 12" starting position to the 10" starting position on a 12" record, which would be the case if the solenoid 161 were de-energized immediately after the needle is let down in the 12" starting position.

Now, since the block member 117 moves with the reproducer arm, the contact strip 165 thereon moves out of contact with the brush 164 after the needle of the reproducer has passed the 10" starting position (while it is playing the 12" record) and consequently, the releasing of the reciprocable member 92 after it has passed the 10" starting point will not tend to move the needle inwardly on the record and consequently the 12" record is played as smoothly as the 10" records are.

From the above, it will be seen that when the 10" and 12" records are intermixed, the reproducer arm will stop in its normal position and let the needle down to start the 10" record and that if a 12" record falls to the turntable, it actuates the detent 156 and sets up a holding circuit in one of the windings of a solenoid 161. This causes the plunger 162 to be moved downwardly in the path of the stop 163 on the reciprocable member 92, thereby arresting the reproducer arm with the needle above the outer groove of the 12" record so that when the reproducer is let down, as will hereinafter be described, the needle correctly starts in the outer groove of the 12" record. The holding circuit is maintained until the needle playing the 12" record moves in to a point beyond the normal starting point for a 10" record; then, the holding circuit is broken by the disengagement of the restrained brush 164 from the conductive strip 165 and the needle continues to play the 12" record without interruption.

Referring to Figures 2, 3 and 5, the lever member 94 which was previously described as having a roller 93 on the end thereof, is pivotally mounted on a bracket 168 by means of a pivot pin 169. The bracket 168 is secured to the plate 20 by means of rivets 170. The left end of the lever member 94, as seen in Figures 2 and 5, is offset downwardly so that its left end 171 is substantially horizontally positioned below the head 142 formed on the shaft 141. Normally, the portion 171 of the lever member 94 clears the head 142 when the reproducer arm is traversing the sound track on the record. At the same time, the roller 93 rests in a depression 172 formed in the lower cam surface 90 of the cam 89. When the cam 89 rotates, the roller 93 encounters the main shaft surface 90, and in doing so, moves substantially downwardly and this causes the end 171 of the lever member to move upwardly so that it engages the head 142 and urges the shaft 141 upwardly. This motion is transmitted to the reproducer arm via the end disc 143 with the result that the outer end carrying the reproducer 145 is raised to a point higher than the thickness of the number of records lying within the capacity of the device.

As soon as the reproducer arm is moved back to the playing position, regardless of whether it is to begin a 10" record or a 12" record, the needle is directly above the starting point for whichever record has last fallen upon the turntable, then, as the cam 89 rotates further, the roller 93 encounters the depression 172 in the cam surface 90 with the result that the reproducer arm is lowered to bring the needle into engagement with the outer groove on the record.

Referring now to Figures 11-16, inclusive, a modification of the invention is shown wherein I employ a mechanical trip which is actuated by each 12" record as it drops upon the turntable. In this arrangement, the reproducer arm is normally swung to the proper position for playing 10" records; however, when a 12" record drops upon the turntable, it engages and actuates a mechanical trip and each time this trip is actuated, the reproducer arm, instead of swinging into the normal position for starting 10" records, does not swing in as far, and comes to rest immediately above the starting position for a 12" record. Of course, in each case, the mechanism for letting the reproducer arm down, so that the needle may engage the sound track in the record, acts after the reproducer arm has been brought to the proper playing position in accordance with whether 10" or 12" records are to be played.

In the modification, the base plate 20a supports the turntable and the motor drive thereof and the center of the turntable is indicated at 173 and the details of the center post and the pinion are shown in the form of the invention described above and need not be repeated. The cutaway gear in the modification is designated by the numeral 38a and is identical with the gear 30 described above. The gear is supported on a shaft 32a which carries cams, such as the cam 41 (not shown) for controlling the trip mechanism for starting the next change cycle and the releasing of the records.

The shaft 32a also carries a cam 174 which corresponds to the cam 89 insofar as the action of raising and lowering the reproducer arm is concerned. It has a lower camming surface, such as the camming surface 90, shown in Fig. 5, which has a depression 172 therein which co-operates with the roller 93 on the lever member 94. Consequently, the corresponding lever member, as shown in Figures 11 and 12, is designated by the numeral 94a. The peripheral outline of the cam 174 is slightly different from the periphery of the cam 89.

A lever 175 is pivotally supported on a suitable shaft mounted in a boss 176 on the frame 20a. The lever includes a portion 177 which carries a roller 178 which engages the periphery of the cam 174. The lever also has a portion 179 which has its axis angular with respect to the portion 177 and mounted on the outer end of the portion 179 is a roller 180. A bracket 181 mounted on the frame carries a screw 182 by which one end of a spring 183 is secured to the end of a bracket 181. The other end of the spring is connected to the lever portion 179 via a hole 184 formed therein.

Now, as the shaft 32a rotates, the lower end of the lever portion 179 and the roller 180 carried thereby, move along a circular path, due to the fact that the lever is pivoted. Secured on the lower end of the tone arm shaft, in place of the block member 117, is an L-shaped member 185, which has an angular active surface 186 and an active surface 187. The member 185 also carries a pawl member 116a which is centralized by the two legs of a U-shaped spring 188. This pawl is adapted to cooperate with a series of notches 115a formed on the lever arm 60a (which corresponds to the lever arm 60 described above in connection with the first modification).

Referring to Figures 13 and 15, a boss 189 is secured to the plate 20a by means of screws 190. The boss 189 is rectangular and has a slot 191 formed therein. Crossing this slot are aligned holes 192 through which a pin 193 extends. A lever 194 has its right end journaled on the pin 193. This lever 194 has a lateral lug 195 preferably formed integral therewith. A spring 196 which is secured on the boss 189 by the screw 190a bears on the lug 195 and urges the lever 194 in a counter-clockwise direction, as seen in Figure 13. The lever has near the other end thereof, a portion cut away to form a notch 197 and a second notch 198 spaced apart therefrom, leaving a flat depressed surface 199 therebetween. An L-shaped bracket has one leg 200 secured to the plate 20a by means of screws 201. The bracket also has a leg 202 extending vertically downwardly from the plate and has a lever 203 secured thereto by means of a pivot pin 204.

A spring 205, secured on the leg 200 of the bracket, extends through a hole 206 in the lower end of the lever 203. The lever 203, as may best be seen in Figure 15, has a portion cut away to form a notch 207. The lever 203 extends through a rectangular hole 208 formed in the plate 20a, and the spring 205 urges the lever 203 to a vertical position wherein the notch 207 engages the lug 195.

Since the spring 196 urges the lever 194 downwardly, the notch 207 arrests the lever 194 when the lever 203 is in its normal position (the position shown in solid lines in Fig. 15). Now, when the lever 203 is displaced laterally, as will presently be described, the notch 207 is disengaged from the lateral lug 195 so that the lever 194 can move downwardly to the position shown in Figure 14, wherein the notch 197 engages the lever portion 179 and limits the movement of the latter.

Secured to the lever portion 179 is a block member 209 and abutting the block 209 is a bracket member 210. These two members are secured to the lever portion 179 by means of screws 211. Mounted in the lever portion 179 is a stop pin 212. The bracket 210 has, as may be seen in Figure 16, a lug portion 213 which carries a stud 214 upon which a pawl 215 is journaled. A spring 216, one end of which is secured under one of the screws 211, has its other end 217 bearing against a beveled surface 218 formed on the pawl member 215 and consequently urges it in contact with the surface 199 formed in the lever 194 between the notches 197 and 198. As seen in Figure 16, the boss 176 is, in fact, a shouldered screw which threadedly engages the base plate 20a. Between the lever 175 and the plate 20a is a spacer sleeve 219, one end of which is counterbored to accommodate the shank 220 of the shouldered screw 176 so as to leave the lever 175 freely movable.

Carried on the upper end of the lever 203 is, referring to Figure 15, an engageable member 221. This member is journaled on a stud 222 and is normally at rest with the side 223 in contact with a stop pin 224 in the lever 203. A spring 225 has one end engaging a stud 226 carried by the member 221 and its lower end is secured to the lever 203 a substantial distance from the member 221.

The member 221, as stated above, is in its normal position with the surface 223 engaging the stud 224, which is a stop. As also stated, normally the lever 203 stands vertical, as shown in solid lines in Figure 15.

Assuming that the machine is loaded with a stack of records, some of which are, for example, 10" in diameter, and some of which are, for example, 12" in diameter, in fact, the stack could be 10" and 12" records alternated, and assuming that the bottom record of the stack is a 10" record, this 10" record, designated by the numeral 228, when released, falls to the turntable, and from the showing in Figure 15, it will be seen that the edge of this record does not affect the engageable member 221. The lever 194 is in the position shown in Figure 13, where the notch 197 is not engaged by the lever portion 179. Therefore, the lever 175, of which 179 is a portion, is allowed to follow the contour of the cam 174, with the result that the tone arm is swung in to the position where the needle 146 is above the outer extremity of the sound track 228a of the 10" record 228.

As the tone arm comes to rest with the needle in this position, the tone arm is let down so that the needle will engage the record by means of the lever member 94a and the record starts playing.

After the record has been played and the needle engages the "wiggling" groove, the pawl 116a engages the teeth 115a and initiates the next record cycle. The shaft 56 is withdrawn from the gear 38 and the changing cycle begins, due to the fact that the spring 48 urges the gear in a direction to cause its teeth to mesh with the pinion 31.

Without repeating all of the steps of the operation in detail, the tone arm is raised from the record, it is swung out to a point where it clears a path, even for the 12" record to fall, and the succeeding record, which is the bottom one on the pile, is released, and it falls to the turntable. Now, it was assumed above that the next record will be a 12" record and this is designated in Figure 15 by the numeral 229. In falling to the turntable, this record momentarily engages the engageable member 221 and swings it to the dotted position shown in Fig. 15. This releases the lever 194 from the notch 207 and allows it to assume the position shown in Figure 14. The lever 203, after having been swung to the dotted position and released, tries to accommodate its normal vertical position but is arrested by coming in contact with the edge of the lateral lug 195 on the lever 194.

Now, when the tone arm is swung inwardly to assume the proper playing position, the lever portion 179 is arrested by the notch or stop 197 and when so arrested, the needle 146 is stopped directly above the beginning of the sound track 229a of the 12" record, so that when the member 94a lets the tone arm down onto the record, it begins at the beginning of the sound track on the 12" record. When the tone arm is moved outwardly, the pawl 215 engages the notch 198 and thus the extreme outer position of the reproducer arm is defined.

When the pawl comes against the notch 198, the portion 179 of the lever 175 can no longer move to the left, as seen in Figure 14, for example. Consequently, any further urge in that direction causes the pawl to move in a clockwise direction, as seen in Figure 14, with the result that the lever 194 is pushed upwardly (also in a clockwise direction) until the extension 207 on the lever 194 has been raised slightly above the notch 207 in the vertical lever 203, and thus the lever 194 is held up in the position shown in Figure 13, which is the reset position for a 10" record. However, if the next record to be played is a 12" record instead of a 10" record, the engageable member 221 may be engaged by the 12" record as it falls onto the turntable, and thereby the lever 203 is swung to the right, in a clockwise direction, as seen in Figure 15, thereby releasing the lever 197 and allowing it to assume the position shown in Figure 14, so that the needle in the tone arm is let down at the beginning of the 12" sound track, instead of the 10", if the lever 203 had not been tripped.

From the above it will be seen that my modification herein shown and described is very simple in construction; it involves very few parts, very few springs, and there is very little mechanism to get out of order.

When it is desired to remove the records from the turntable, the engageable member may be swung in a clockwise direction about the axis 222 to a point where the surface 227 rests against the stop pin 224. After the records are removed, the engageable member may be flipped back to its normal position. The spring 225 holds the engageable member in either of said positions.

It is to be understood that the above detailed description of the present invention and the modification thereof is intended to disclose embodiments thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. A record changer having a turntable and means to drive the same, a reproducer arm adapted to play records on said turntable and to initiate record changing cycles, and means for effecting record changing operations, a central hole in said turntable, a stationary post extending substantially vertically through said hole and having the upper portion thereof offset to form a shoulder upon which the lower record of a stack of records may rest, a movable post also extending through said hole and adjacent to said stationary post and having its upper extremity adjacent to said shoulder, said movable post being supported for movement both vertically and laterally within the center hole of said lower record, said movable post being in cooperative relation with said means for effecting record changing operations, and a rubber-like retardation element secured to said movable post intermediate said end and said turntable, and consequently in the path of and for reducing the force of the fall of records as they are released from said stack by the movements of said movable post.

2. A record changer having a turntable and means to drive the same, a reproducer arm adapted to play records on said turntable and to initiate record changing cycles, and means for effecting record changing operations, a central hole in said turntable, a stationary post extending substantially vertically through said hole and having the upper portion thereof offset to form a shoulder upon which the lower record of a stack of records may rest, a movable post also extending through said hole and adjacent to said stationary post and having its upper extremity adjacent to said shoulder, a support for said movable post positioned between the upper surface of said turntable and said shoulder and arranged to allow said movable post to move both vertically and laterally within the center hole of said lower record, said movable post being in cooperative relation to said means for effecting record changing operations, and a rubber-like retardation element secured to said movable post intermediate said end and said turntable, and consequently in the path of and for reducing the force of the fall of records as they are released from said stack by the movements of said movable post.

3. In a record changer having a turntable and means to drive the same, a reproducer arm adapted to play records on said turntable and to initiate record changing cycles, a non-rotative support extending vertically above said turntable and including a ledge upon which the lowermost of a stack of records rests in spaced relation to said turntable, and a rubber-like retardation element carried on said non-rotative support in the path of and adapted to engage and momentarily arrest each record as it is falling to said turntable, said non-rotative support being comprised of a stationary member and a movable member movable both endwise and laterally and in which said movable member supports said retardation element.

4. In a record changer having a turntable and means to drive the same, a reproducer arm adapted to play records on said turntable and to initiate record changing cycles, a non-rotative strip forming a support extending upwardly above said turntable and having a ledge upon which the lowermost of a stack of records may rest in spaced relation to said turntable, a second non-rotative strip supported on said first strip for movement both laterally and upwardly, said support and said strip being of a width to be traversed by the central holes in said records, a rubber-like retardation element secured on said second strip between said ledge and said turntable in the path of and for momentarily arresting each record as it falls to said turntable, and cam means for controlling both the upward and the lateral movements of said second strip.

5. The invention according to claim 4 wherein said cam means, when at rest is in such position that records moved upwardly from the turntable are easily removed, due to the displacement of said second strip by the engagement of said retardation element with the holes in the records.

DUDLEY H. SMITH.

References Cited in the file of this patent
UNITED STATES PATENTS

| Number | Name | Date |
|---|---|---|
| 1,725,237 | Wierth | Aug. 20, 1929 |
| 2,237,340 | Downs | Apr. 8, 1941 |
| 2,271,001 | Fortune | Jan. 27, 1942 |
| 2,286,490 | Knox | June 16, 1942 |
| 2,291,158 | Hostensson et al. | July 28, 1942 |
| 2,295,092 | Offen | Sept. 8, 1942 |
| 2,307,030 | Erwood | Jan. 5, 1943 |
| 2,309,352 | Offen | Jan. 26, 1943 |
| 2,328,052 | Butler | Aug. 31, 1943 |
| 2,498,333 | Faulkner | Feb. 21, 1950 |